Sept. 2, 1969   J. W. EHLEN   3,464,201
METHOD OF REMOVING PIN MEANS FROM LINK CHAIN DEVICES
Filed Dec. 12, 1966

INVENTOR
JACK W. EHLEN

BY  Burns, Doane, Benedict,
Swecker & Mathis
ATTORNEYS

United States Patent Office 3,464,201
Patented Sept. 2, 1969

3,464,201
METHOD OF REMOVING PIN MEANS FROM LINK CHAIN DEVICES
Jack W. Ehlen, Torrance, Calif., assignor to McCulloch Corporation, Los Angeles, Calif., a corporation of Wisconsin
Filed Dec. 12, 1966, Ser. No. 601,115
Int. Cl. B21l 9/06; B23p 11/00, 19/00
U.S. Cl. 59—7                           4 Claims

ABSTRACT OF THE DISCLOSURE

This application discloses using a support with a slot therein that has longitudinally converging side walls for gripping a link of a chain while removing a rivet therefrom.

---

This invention relates to a method of removing rivets from link chain devices. In particular it relates to a method of removing rivets from chain saws.

Summary of the invention

Chain saw devices, including cutter chains fabricated from links pivotally interconnected by rivets, are widely used under field conditions. Where the cutter chain of such a chain saw becomes broken in the field, when shop facilities are not available, its repair presents substantial problems. Indeed, the small nature of the parts from which a cutter chain is fabricated makes the repairing of a broken chain difficult even under shop conditions where adequate tools are available.

A variety of tools have been previously developed for securing a link so that a rivet may be driven out of a link chain to facilitate link replacement. Such devices are shown, for example, in the following United States patents: 1,436,429 (Bean), 1,469,594 (Harley), 2,747,-362 (Cox), 2,774,212 (Jacobs), 3,063,236 (Cannon), 3,135,141 (Aitken), 3,212,253 (Granberg).

It will be noted that these prior patent devices are all characterized by link holding mechanisms having moving parts which must be manipulated to secure a link connected with a rivet to be removed. Further, the size of the devices is such as to make them less than convenient to carry in the field. In general, these devices are structurally complex and both tedious and difficult for unskilled personnel to manipulate.

The state of the art, as reflected by these prior patents, dictates the pressing need for a link chain repairing device which may be easily carried in the field, which is foolproof and easy to use even by unskilled personnel, which is both inexpensive to fabricate and resistant to breakage, and which requires little or no maintenance.

Accordingly, it is an object of the present invention to provide an improved apparatus for removing rivets from link chain devices which includes a one-piece, link-holding device devoid of moving parts.

It is also an object of the invention to provide improved methods and apparatus for removing rivets from link chain devices which provide a uniquely effective wedging type of link-holding action and which will accommodate links having a variety of widths.

A further object of the invention is to provide a link chain securing device which is portable and, indeed, so small that it may be carried in the pocket of a user under field conditions.

In order to accomplish at least some of the foregoing objectives, there is presented through this invention a unique combination wherein a link chain cooperates with a recessed body to positively and wedgingly secure a link connected with a rivet to be removed from a link chain device. This combination is characterized by a body and a recess in the body having a base and converging side walls. A link chain device is positioned so that one link is disposed in wedged engagement with the side walls of the recess. Link means adjacent this one link rest on edge portions of the recess so as to support the one link above the base of the recess. Means such as a conventional punch are provided for driving at least one rivet connected with the one link partially out of a portion of the link chain device and toward the base of the recess.

A principal method aspect of the invention entails the wedging of at least one end of a link of a link chain device between converging wall means. This link is supported adjacent, but spaced from, the base of cavity means. Rivet means engaged with the wedged link are driven partially out of the chain device and into the cavity means toward its base.

In describing the invention, reference will be made to preferred embodiments illustrated in the accompanying drawings.

In the drawings:

FIGURE 1 is a top plan view of a one-piece, metallic block illustrating a longitudinally tapering recess which serves as a link-securing device;

FIGURE 2 provides an end view of the FIGURE 1 block;

Figure 3:
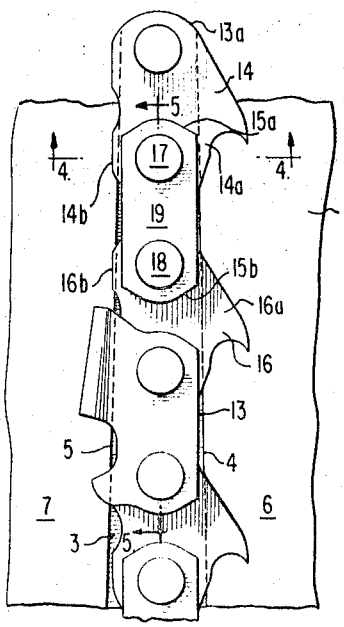
FIGURE 3 is an enlarged top plan view illustrating a cutter chain cooperating with the FIGURE 1 block to secure a link connected with rivets to be removed from the device.
Figure 2:
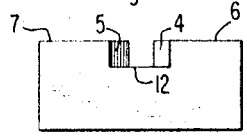
Figure 5:
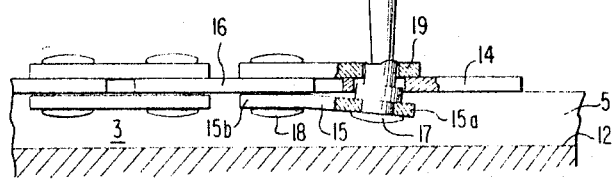
Figure 6:
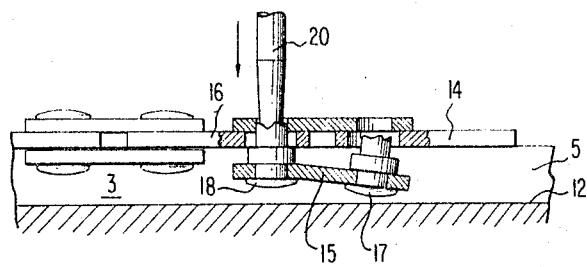

FIGURE 5 is a longtitudinal sectional view of the FIGURE 3 combination as viewed along the section line 5—5, with a punch disposed in driving engagement with a first rivet to be removed; and FIGURE 6 is a longitudinal sectional view of the FIGURE 3 combination as viewed along the section line of 5—5 and illustrating the position of the initially wedged link during the driving out of a second rivet.

Combination anvil and link-holding device

Figure 1:
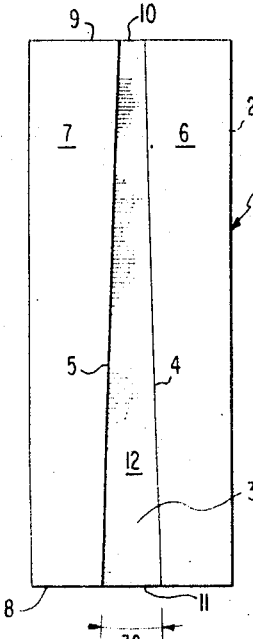

FIGURE 1 illustrates a one-piece combination anvil and link-holding device 1.

Anvil 1 is preferably fabricated from steel and comprises a generally elongated block-like body 2 and a longitudinally extending recess 3.

Recess 3 is defined by smooth, planar walls 4 and 5 which are perpendicular to coplanar, top-block surfaces 6 and 7, and which converge from block end 8 toward block end 9. Walls 4 and 5, in addition to being perpendicular to the same common plane defined by surfaces 6 and 7, converge in the preferred embodiment at an angle of about 3° as shown in FIGURE 1.

As shown in FIGURE 1, opposite ends 10 and 11 of recess 3 are open. The base of recess 3 is defined by a smooth, planar wall 12 which is spaced inwardly of the block from coplanar surfaces 6 and 7.

Cooperation of holding device and link chain to secure a link

Figure 4:
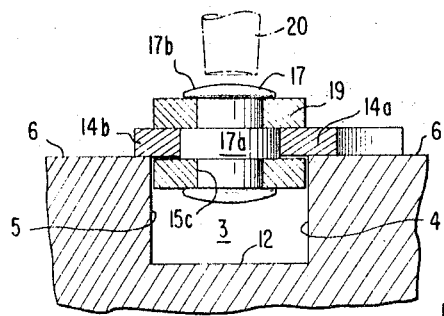
FIGURE 4 is a transverse sectional view of the FIGURE 3 combination as viewed along the section line 4—4.

FIGURES 4 through 6 illustrate the manner in which a damaged cutter chain cooperates with the holding block 1 to secure a link connected with pin means, such as rivets, which are to be removed from the chain.

As shown in FIGURE 3, a chain 13 having a broken end 13a adjacent a base link 14 is disposed in cooperating relation with the block 1.

In this relationship, a generally rectangular, side link 15, connected with link 14, is disposed within the recess 3 between upper portions of the walls 4 and 5. One end 15a of link 15 is wedgingly engaged between laterally opposite portions of walls 4 and 5. Because of the generally rectangular nature of the link 15 and the converging character of the walls 4 and 5, the opposite end 15b of the link 15a is not disposed in wedging engagement with the walls 4 and 5. At least one lateral edge of the link end 15b is spaced from its laterally adjacent side wall of the recess 3.

Side link 15, as shown in FIGURE 3, may be one of two identical side links on opposite sides of link 14. In chain 13, the side links on each side of the cutter chain alternate with cutter links. Where a damaged link is adjacent a cutter side link, the cutter link should face away from the recess, so that the oppositely disposed rectangular link will be within the recess 3.

Link 15 is supported in the upper portion of the recess 3 by transversely or laterally projecting edges of base, or center links 14 and 16.

As shown in FIGURE 3, edge portions 16a and 16b of link 16 rest on portions of surfaces 6 and 7, respectively. Similarly, side portions 14a and 14b of link 14 rest on portions of surfaces 6 and 7, respectively. Thus, links 14 and 16, each of which is adjacent one end of the link 15, rest on the surfaces 6 and 7. Because of the rivets 17 and 18, which connect the links 14 and 16 with the side link 15, and its identical mate, side link 19, this arrangement enables the link 15 to be supported or held within the upper portion of recess 3, as generally shown in FIGURES 3 and 4.

Thus the links of the chain device 13, which are adjacent the link 15, cooperate with the block 1 to stabilize the position of the link 15.

As shown in FIGURE 4, rivet 17 is of the type having an enlarged mid-portion 17a. Thus mid-portion 17a of rivet 17 projects laterally beyond the rivet opening 15c to abuttingly engage the top side of the rivet 15 when the elements of the combination are disposed as shown in FIGURE 4.

In order to effect the positioning of the link 15 as above described, the chain should be positioned with the broken end 13a disposed adjacent the wider end of the recess 3 with the link edge portions 14a, 14b, 16a and 16b engaging the recess edges, i.e., block surfaces 6 and 7. The chain thus disposed is then slid toward the narrowing end of the recess 3 until the leading end 15a of the link 15 wedge-engages the walls 6 and 7. In this connection, it will be realized that the surfaces 6 and 7, immediately underlying the link portions 14a, 14b, 16a and 16b, function as smooth rails to facilitate the unimpeded sliding movement of the chain 13 so as to bring the link 15 into its wedged or secured position.

It will also be noted, by reference to FIGURE 4, that the walls 6 and 7 are dimensioned so as to space the recess base 12 at a sufficient distance beneath the link 15 so as to enable the rivets 17 and 18 to be moved downwardly fully out of at least the link 19.

Removal of rivets from link chain devices

FIGURES 4, 5 and 6 illustrate the manner in which a conventional punch may be used to drive rivets 17 and 18 out of the link chain device 13.

With the link 15 disposed as shown in FIGURES 3 and 4, a punch may be engaged with the exposed head 17b of the rivet 17, and possibly inclined slightly along the longitudinal axis of the recess 3 so as to impart to the rivet 17 a force vector extending generally in the converging direction of the walls 6 and 7. Driving blows are delivered by a hammer to the punch 20 so as to drive the enlarged rivet head 17b through link opening 19a. When the punch is inclined downwardly toward the narrow end of recess 3, a vector will be transmitted to the chain 13 tending to urge the link 15 into wedged or secured engagement with the walls 6 and 7.

In this connection it should be realized that in many instances the initial wedging of the link 15 may be sufficient such that the punch 20 may be driven perpendicular to the median longitudinal plane of the chain 13, i.e., coaxial of the rivet 17.

As noted in FIGURE 5, rivet 17 is the first rivet driven from the link chain 13. During the driving out of the rivet 17, the leading, i.e., wedged end, 15a of the link 15 rotates downwardly into the recess 3 generally about the trailing rivet 18. After the rivet 17 has been removed, as shown in FIGURE 5, the trailing rivet 18 may be driven out of the link 19 of the chain 13.

This driving sequence may be advantageous in minimizing resistance to driving forces. If the rear rivet 18 were first driven out of the link 19, the driving of the rivet 17 would commence with the link end 15b inclined downwardly and away from the rivet 17. With link end 15b thus disposed, link end 15a would be required to rotate about pin 18. Since this rotation would tend to induce the wedged link end 15a to dig into the engaged portions of the walls 6 and 7, some resistance to driving of the rivet 17 would be experienced in following this sequence.

However, it will be understood that where a sufficiently hard anvil or block 1 is employed, the sequence of driving the rivets 17 and 18 may not be of practical consequence. Where a relatively soft anvil block 1 is employed, the illustrated sequence of pin-driving is preferred so as to minimize scoring of the wall surfaces 6 and 7, which would result from rotating the end 15a so as to tend to cause this end to dig into the walls 6 and 7.

Summary of advantages and scope of invention

A prime advantage of the invention resides in the discovery that a simple wedging notch or recess may be used to effectively secure a link connected with rivet means to be removed from a link chain device. This discovery having been made, it is possible, following the teaching of the invention, to employ a conventional punch and a one-piece recessed block to effect chain repairs either in the shop or field.

This combination is uniquely effective and easy to employ. To secure a link, it is merely necessary to lay a portion of the chain across the top of the recess 3 so that portions of links adjacent the link to be wedged engage the rail-like edges of the recess and then slide the chain in the converging direction of the recess so as to wedge the link in place. Thereafter, rivets may be removed from the wedged link by a conventional punch, with the punching action itself serving to intensify the wedging action if desired.

This concept wholly eliminates complicated, multiple element, link-chain repair devices and enables unskilled personnel to conveniently and effectively perform link chain repairs.

Of particular significance is the manner in which this combination accommodates to the repairing of link chains where the links vary in size. Because of the taper of the recess 3, worn, as well as new, links may be wedgingly engaged with the walls 6 and 7, with the wedged position of the links varying longitudinally along the recess 3 in accordance with their width.

In describing the invention, reference has been made to preferred embodiments. However, those skilled in the art and familiar with this disclosure, may well recognize additions, deletions, substitutions and other modifications which would fall within the purview of the invention as defined in the appended claims.

I claim:

1. A method of removing pin means from link chain devices, said method comprising:
   wedging at least one end of one link of a link chain device between converging first and second wall means;
   said wedging being effected by moving said one link between and, generally longitudinally of, said first and second wall means in a direction of convergence thereof, until said one link is wedgingly secured between said first and second wall means;

supporting said one link adjacent cavity means, defined at least in part by said converging wall means and spaced from the base thereof; and driving pin means, engaged with said one wedged link, at least partially out of said link chain device and partially into said cavity means;

said driving of said pin means being effected by applying driving force to said pin means in a direction extending substantially transversely of said direction of convergence of said first and second wall means.

2. A method as described in claim 1:

wherein said one link is supported by link means adjacent said one link, with said link means engaging rail means; and wherein said adjacent link means are slid along said rail means with said one link being disposed and supported between said wall means until one end of one link wedgingly engages said wall means, with the opposite end of said one link remaining spaced from at least one laterally adjacent portion of said wall means.

3. A method as described in claim 2:

wherein a pair of pin means is connected with said one link, with the pin means of said pair being longitudinally spaced of said cavity means and said converging wall means; and wherein the pin means of said pair which is in closest proximity to the wedged end of said one link is driven first, with the driving thereof pivoting said one end of said one link downwardly into said cavity means generally about the other of the pin means of said pair.

4. A method of removing pin means from link chain devices, said method comprising:

wedging at least one end of one link of a link chain device between converging first and second wall means;

said wedging being effected by moving said one link between and, generally longitudinally of, said first and second wall means in a direction of convergence thereof, until said one link is wedgingly secured between said first and second wall means;

supporting said one link adjacent cavity means, defined at least in part by said converging wall means and spaced from the base thereof; and driving pin means engaged with said one wedged link at least partially out of said link chain device and partially into said cavity means;

said driving of said pin means being effected by applying driving force to said pin means in a direction extending substantially transversely of said direction of convergence of said first and second wall means;

said driving force having a vector component inclined generally longitudinally in said convergence direction of said first and second wall means so as to transmit force to said one link, tending to urge said one link into wedging engagement with said wall means.

References Cited

UNITED STATES PATENTS

| | | | |
|---|---|---|---|
| 145,556 | 12/1873 | Cooper | 269—287 X |
| 2,094,849 | 10/1937 | Schneider | 248—223 X |
| 3,135,141 | 6/1964 | Aitken | 59—11 X |

CHARLIE T. MOON, Primary Examiner

U.S. Cl. X.R.

29—243.52, 427; 59—11; 248—225; 269—287